W. A. READE.
COMPOSING MECHANISM FOR TYPOGRAPHS.
APPLICATION FILED OCT. 28, 1912.
1,146,278.
Patented July 13, 1915.
5 SHEETS—SHEET 1.
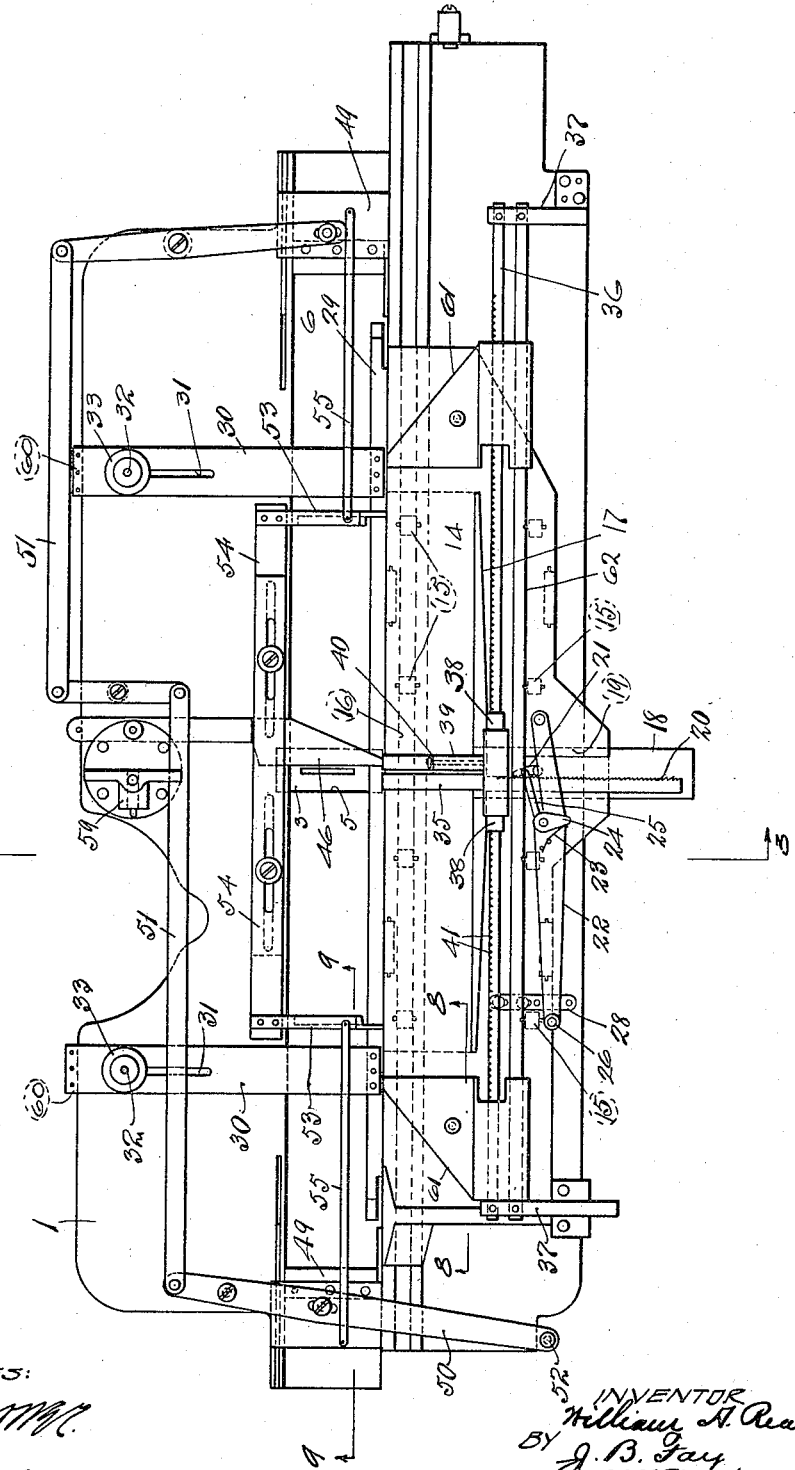
WITNESSES:
INVENTOR
William A. Reade
BY J. B. Jay
ATTORNEY W. A. READE.
COMPOSING MECHANISM FOR TYPOGRAPHS.
APPLICATION FILED OCT. 28, 1912.
1,146,278.
Patented July 13, 1915.
5 SHEETS—SHEET 2.
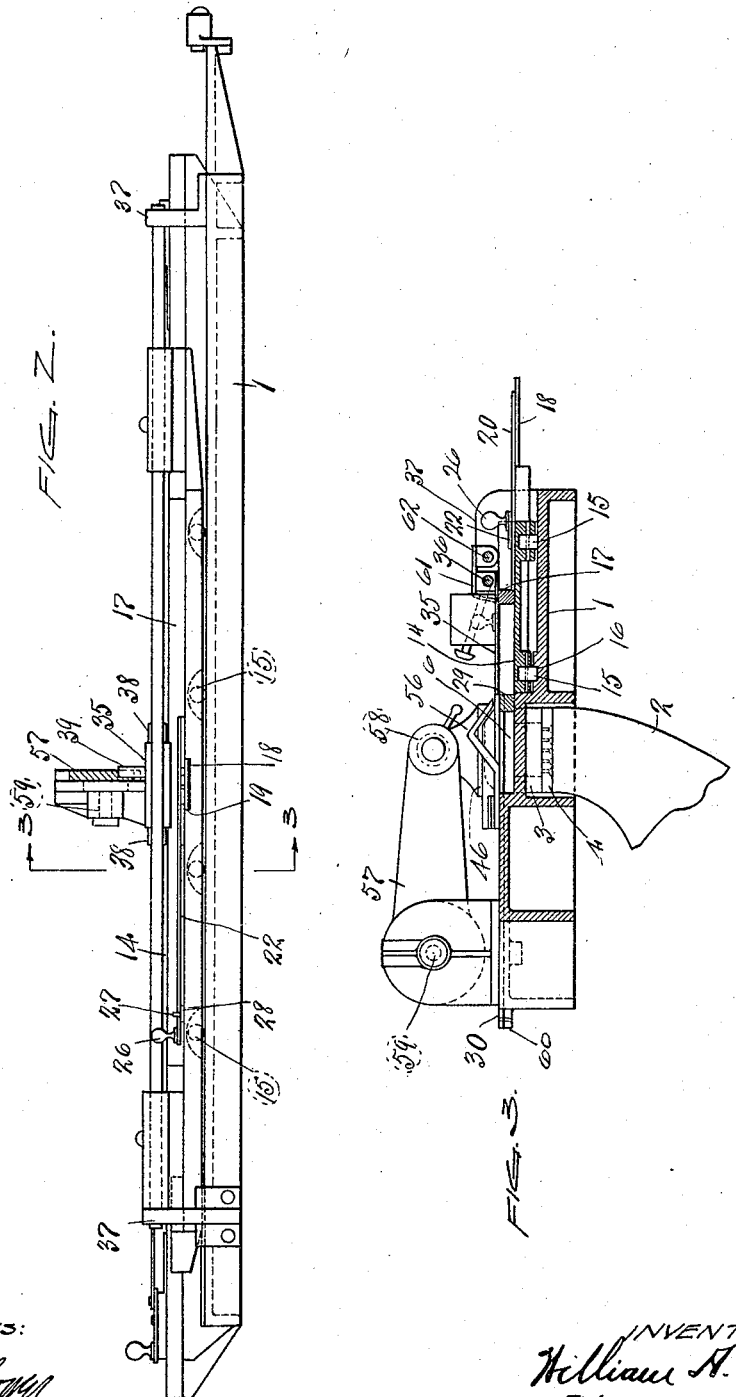
WITNESSES:
INVENTOR
William A. Reade
BY
J. B. Jay
ATTORNEY W. A. READE.
COMPOSING MECHANISM FOR TYPOGRAPHS.
APPLICATION FILED OCT. 28, 1912.
1,146,278.
Patented July 13, 1915.
5 SHEETS—SHEET 3.
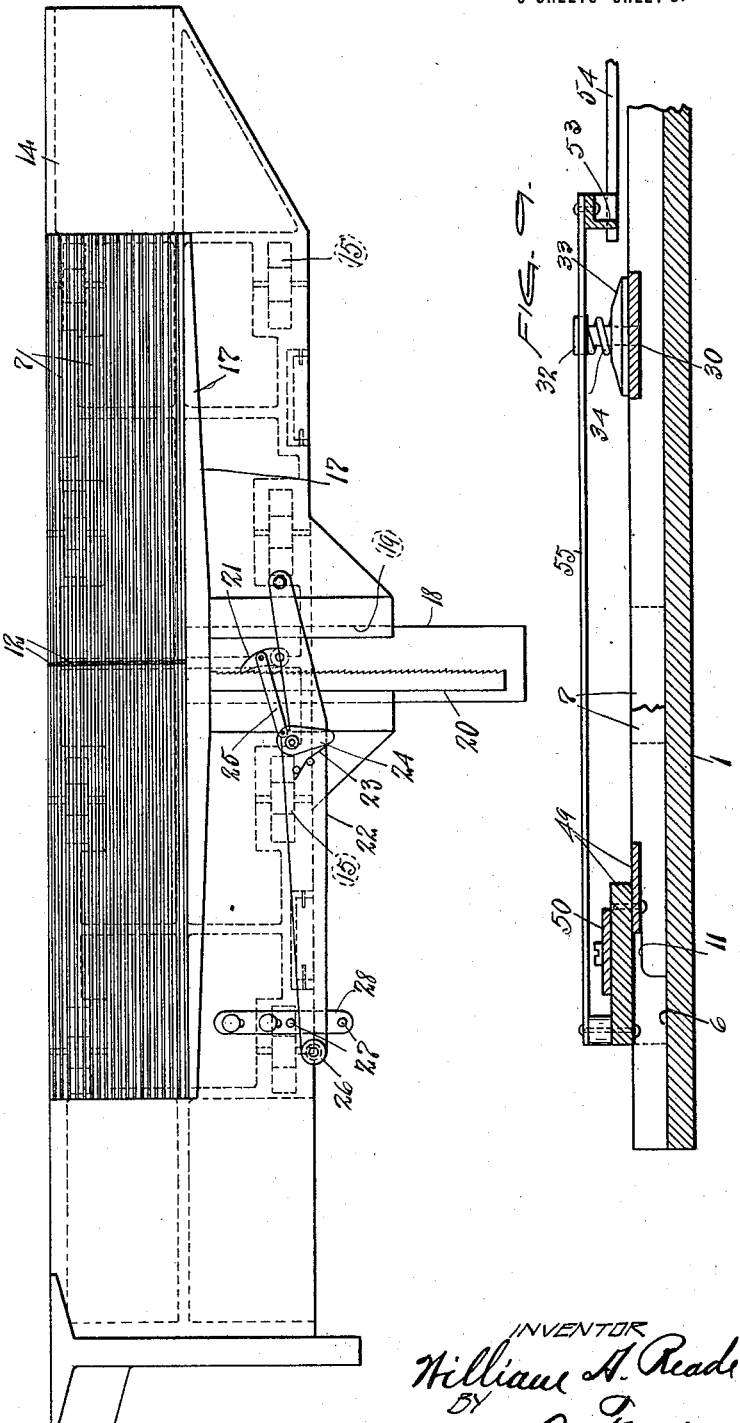
WITNESSES:
INVENTOR
William A. Reade
BY
J. B. Fay
ATTORNEY

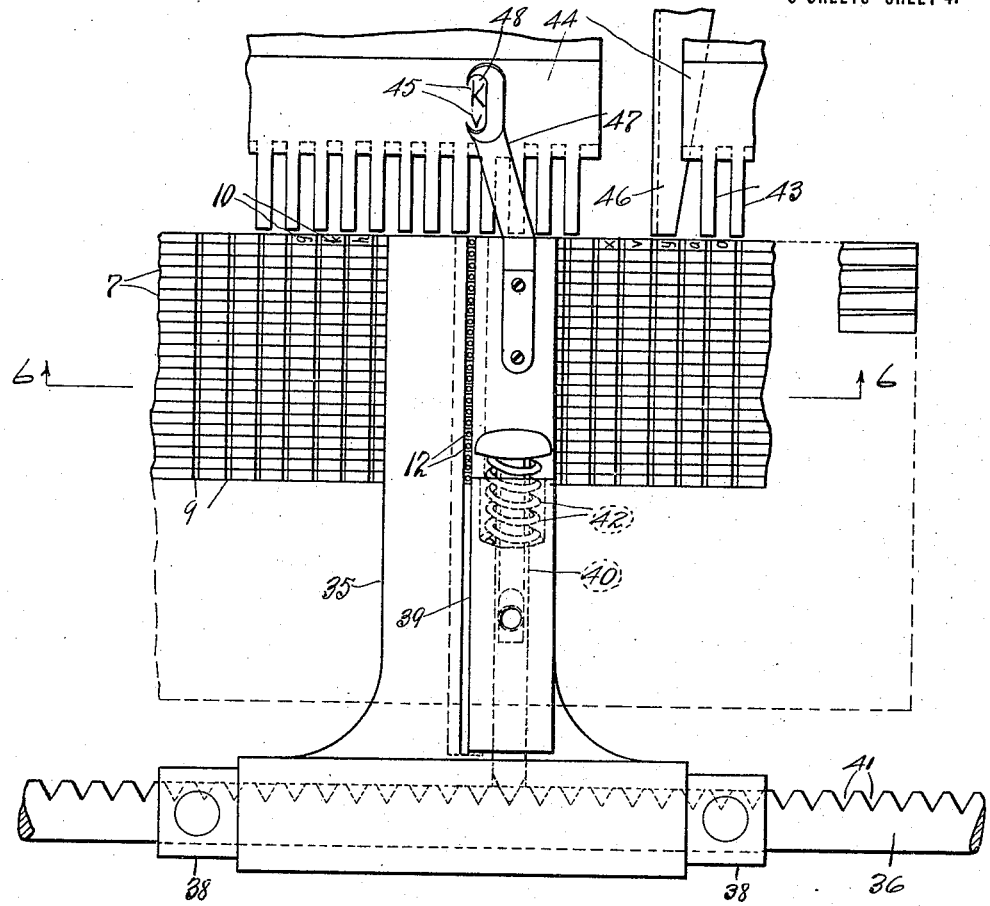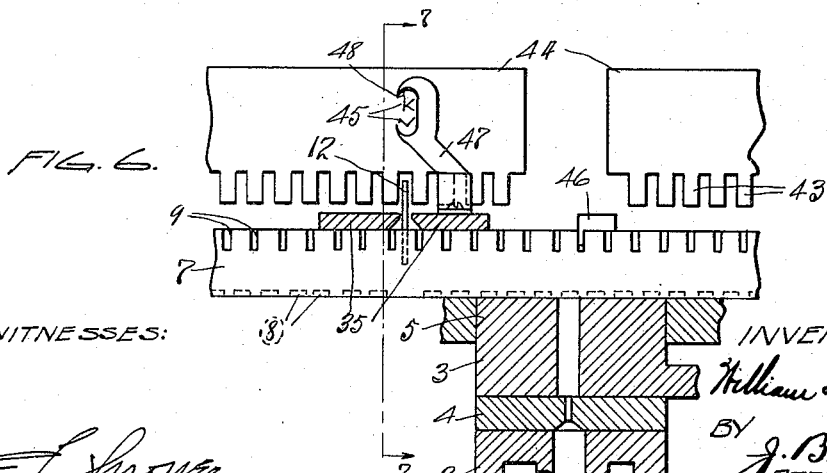

W. A. READE.
COMPOSING MECHANISM FOR TYPOGRAPHS.
APPLICATION FILED OCT. 28, 1912.
1,146,278.
Patented July 13, 1915.
5 SHEETS—SHEET 5.
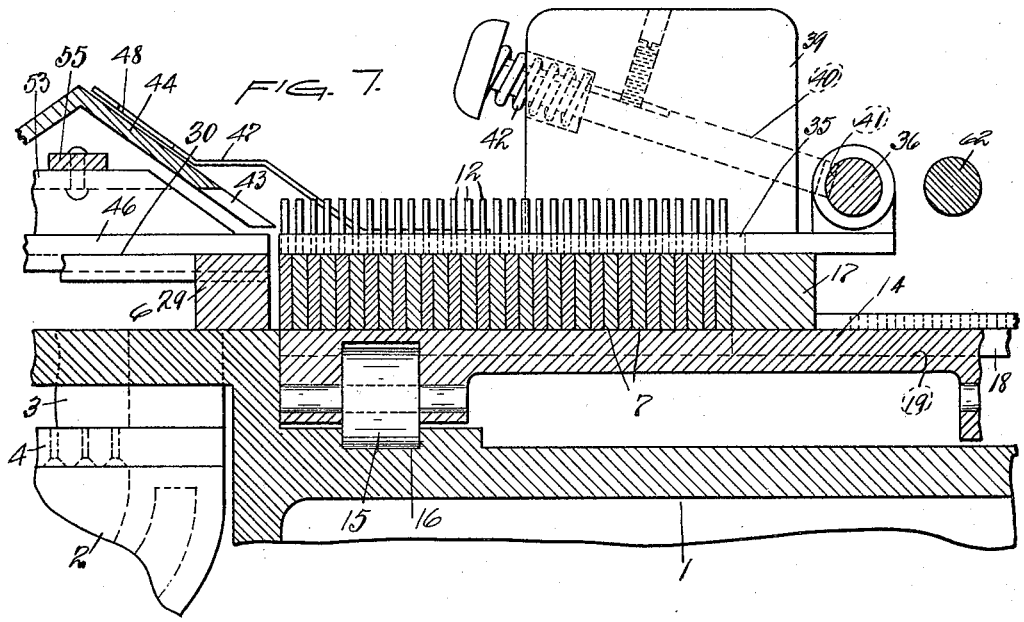
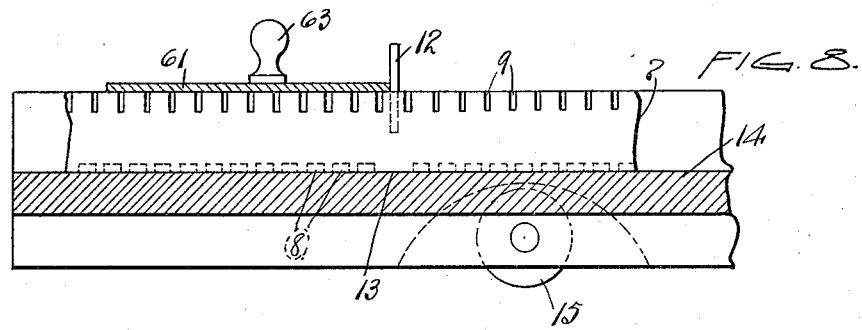
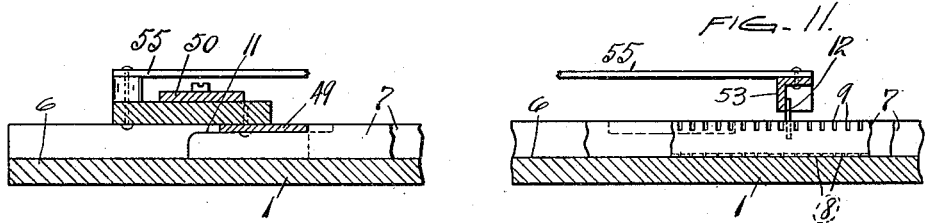
WITNESSES:
INVENTOR
William A. Reade
BY
J. B. Fay
ATTORNEY

United States Patent Office.

WILLIAM A. READE, OF CLEVELAND, OHIO, ASSIGNOR TO THE LUDLOW TYPOGRAPH COMPANY, OF CLEVELAND, OHIO, A CORPORATION OF MAINE.

COMPOSING MECHANISM FOR TYPOGRAPHS.

1,146,278.  Specification of Letters Patent.  Patented July 13, 1915.

Application filed October 28, 1912. Serial No. 728,047.

*To all whom it may concern:*

Be it known that I, WILLIAM A. READE, a citizen of the United States, and a resident of Cleveland, county of Cuyahoga, and State of Ohio, have invented a new and useful Improvement in Composing Mechanism for Typographs, of which the following is a specification, the principle of the invention being herein explained and the best mode in which I have contemplated applying that principle, so as to distinguish it from other inventions.

The general class of typograph to which the present invention relates is that known commercially as the "Ludlow" typograph one form of which is described and claimed in U. S. Letters Patent No. 856,531, issued to Washington I. Ludlow, June 11, 1907. In such Ludlow typograph, the means for casting the type line, or slug, comprise a plurality of matrix bars adapted to be distributed so as to variously aline the duplicate series of matrices on their under edges and thus compose any desired word, or series of words.

The present improvements relate to the mechanism provided for carrying on the several operations involved in thus distributing, or composing, the matrix bars and in subsequently collecting them together preliminarily to a fresh distribution.

To the accomplishment of these and related objects, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a plan view of the composing mechanism of my improved typograph, the matrix bars, however, being omitted therefrom in order to avoid confusion; Fig. 2 is a front elevational view of such mechanism; Fig. 3 is a transverse section thereof on the line 3—3, Figs. 1 and 2; Fig. 4 is a plan view of a movable member, or tray, which carries the matrix bars, such member being shown removed from the rest of the mechanism; Fig. 5 is a plan view, on a larger scale than the preceding figures, of a portion of the mechanism particularly used in connection with the distributing operation; Fig. 6 is a sectional view of the same portion of the mechanism, the plane of the section being indicated by the line 6—6, Fig. 5; Fig. 7 is another section of the same portion taken at right angles to that of Fig. 6, as indicated by the line 7—7, Fig. 5; Fig. 8 is a sectional view corresponding with that of Fig. 7, but illustrating a portion of the mechanism more particularly used in collecting the matrix bars after they have been distributed, the plane of the section being indicated by the line 8—8, Fig. 1; Fig. 9 is a sectional view of yet another detail, such section being taken on the line 9—9, Fig. 1; while Figs. 10 and 11 illustrate certain of the foregoing parts in coöperative relation to the matrix bars.

The general supporting frame for the mechanism comprising the present invention is not illustrated, but merely the bed-plate, or top 1 of such frame which is utilized as the base or support for the mechanism herein involved. The frame proper it may be explained is also utilized to support the casting mechanism for forming the slugs, or lines of type from the matrix provided by the present mechanism, as will hereinafter be more fully explained, but such casting mechanism forms no part of the present invention and accordingly only so much of it is shown as is necessary to an understanding of the composing mechanism. Indeed the only part of such casting mechanism shown consists of the nozzle or spout 2, (Figs. 3 and 6), through which the molten metal is supplied, and the mold 3, wherein the slug is formed when the metal is thus supplied thereto. Such casting pot spout 2 is terminally closed by a squirt plate 4 that is designed to be brought directly against the under side of the mold when desired, and then removed so as to permit such mold to be lowered from the bed of the machine in order to permit the ejection of the slug therefrom, and such further operations upon such slug, as are necessary, preliminary to its removal to the galley and its setting up in the press frame. When in position for casting, the mold is designed to register with an opening 5 in the bed plate, that is transversely disposed of a longitudinally extending depression or trough 6 in such bed, and it is over the mold when in this position, that the matrix bars are placed in properly distributed fashion so as to provide a composite matrix of selected characters directly over the slot in said mold. Such mold is designed, of course, to fit snugly in the opening in the bed plate with its upper face flush with the bottom of the trough, so that the bars may be moved there across if desired without impediment.

The details of construction of the matrix bars 7 form no part of the present invention and so need be but briefly noted. The major portion of such bars, or as illustrated, the entire body, are preferably made of general tapered form, the taper being continuous from one end to the other end as shown, for example, in Fig. 4. The matrices 8 are then struck in, or otherwise formed, on the lower edges of such bars, regarding the latter as they rest in the trough; while their upper edges are provided with transverse grooves 9, corresponding in position with such matrices, and in connection with the grooves a series of characters 10, (Fig. 5), that likewise correspond with such matrices although not placed directly thereover. These bars are arranged with their tapered ends alternating with the thick ends, whereby the respective bars are maintained in a line substantially parallel with the trough 6, or at right angles to the line of the casting slot in the mold 3, whatever variations may be made in their relative longitudinal positions. Although adjacent bars will thus be seen to bear similar series of matrices, the order of such matrices will obviously be reversed. Such matrices, moreover, terminate short of the thin end of the bars (see Fig. 10), whereby the latter are adapted, when overlapping, to form a blank space of adjustable width. The upper edges of such thin ends of the bars furthermore are cut away as shown at 11 in the same figure, to a depth equal to that of the grooves 9, previously referred to as being formed in such upper edge. In addition to these grooves 9, each of the matrix bars is provided on the same upper edge with a pin 12, or equivalent projection, that is centrally disposed with or otherwise bears a fixed relation to the series of matrices 8 on its under edge. Not only are the lower edges of the bars blank at their ends but a limited number of blank spaces 13 are desirably left among the matrices, being so located along the bar as to provide an assortment of widths. One such blank, moreover, is directly below the pin 12 on the bar's upper edge, as shown in Fig. 8.

In the Ludlow typograph, as heretofore constructed, the entire body of bars, whether in collected or distributed condition, have, when in use, remained at all times in the trough. The operation of distributing the bars has accordingly involved moving the entire, undistributed body back and forth longitudinally of said trough, so as to leave, or drop off, as it were, successive, outermost bars of such body in selected position, that is with the desired matrix on the under edge of each successive outermost bar over the casting slot of the mold. Not only has this entailed more or less wear of the bars, but, on account of the frictional resistance of such movement, the burden on the operator has been unnecessarily great. By the present improvements, accordingly, I propose among other things to provide an independent, longitudinally movable support for the undistributed bars, from which support the bars may be discharged or left off in desired position relatively to the casting slot.

In the preferred form of construction illustrated, such movable support is in the form of a tray or plate 14 supported on the top 1 adjacent to the front edge of the trough 6, the surface of such plate and the bottom of the trough lying in substantially the same plane. The plate or tray 14 is supported upon two alined series of rollers 15, whereby its movement is rendered extremely easy, one such series of rollers being held in a runway 16 on the top and the movement of the tray thus guided.

Transversely movable of said tray and normally lying in front of the space occupied by the collected body of matrix bars, is a bar 17 that is attached to the inner end of a slide 18 suitably secured to the tray in a slide-way 19 therefor provided. Movement of this bar inwardly may be secured in a step-by-step fashion by means of a ratchet mechanism consisting specifically of a ratchet bar 20 carried by the aforesaid slide 18, wherewith a pawl 21 on an oscillatory lever 22 is coöperative, as will be readily understood from an inspection of Figs. 1 and 4. This pawl 21 is normally held in engagement with the ratchet teeth on the bar by a spring 23 pressing against an oscillatory member 24 on the lever that is connected with said pawl by a link 25. The outer end of the lever is provided with a suitable knob or handle 26, for the purpose of operation, and its swinging movement is limited by two stops 27 carried on a transversely adjustable plate or bracket 28 on the tray 14, as need not further be explained.

In the position of parts illustrated in Fig. 1, wherein the bar 17 is normally disposed as just described, a somewhat similar but longer bar 29, extending longitudinally of the trough 6 is disposed to lie alongside the inner edge of the tray 14 and thus provide, as it were, an inner retaining wall, between which and such first-named bar 17, the matrix bars will be held. Said last-named retaining bar is movable transversely of the trough, just as the first-named bar is movable transversely of the tray, movement of the bar in the trough being produced by the pressure of the innermost matrix bar against the same, as the body of matrix bars is moved inwardly by the advance of the outer retaining bar 17. Movement of the inner bar 29 is guided by rearwardly extending arms 30 formed with slots 31 that engage pins 32 in the bed-plate of the machine. Such movement is furthermore restrained in a degree by means of friction disks 33 on said pins that are resiliently held against the upper faces of the arms by means of springs 34 secured in place by clamp nuts on said pins, as shown in Fig. 9.

In the assembled, or collected, condition of the matrix bars, they are designed to be retained in proper longitudinal position on the movable tray, or carriage 14 by means of a transversely disposed slotted arm 35 that is pivotally mounted on a longitudinally extending rod 36 supported at its extremities in brackets 37 on the machine top. Said slotted arm is of relatively light construction and is held in fixed position longitudinally of the tray or carriage 14 by two ears 38, although still left free to oscillate around said rod 36, such ears rising from the carriage and slidably engaging said rod, one on each side of the arm. Said arm is provided with a handle-like projection 39 to facilitate its oscillation and also to serve as a means for longitudinally moving the carriage as a whole. Such handle is, furthermore, provided with a plunger 40 having an inner V-shaped end adapted to engage any one of a series of correspondingly formed notches 41 on the forward edge of the rod 36. A compression spring 42 normally retains such plunger out of engagement with the rod, but by a slight pressure upon the head of the plunger it will be pushed inwardly into engagement with the rod, thereby temporarily locking the carriage against further movement. The number and position of these notches on rod 36 correspond with the number and position of the slots between the teeth 43 of a combined composer frame and index plate 44 that is stationarily supported along the forward edge of the trough 6. Said index plate is preferably inclined, as shown in Fig. 3 and again in Fig. 7, so as to present readily to the eye of the operator a series of designating characters 45 marked thereon in alinement with the several slots just referred to. These slots are adapted to receive and retain, at least for a time, the pins or projections 12 on the matrix bars, the arrangement of the characters on such index plate being such that when a pin is placed in a slot adjacent to any particular character, the matrix of such character on the under edge of the bar will be positioned over the casting slot.

In the normal collected condition of the matrix bars on the carriage, said bars rest with their pins alined and held in the slot in the arm 35. Accordingly, by moving the carriage 14 longitudinally until such slot is brought into register with a selected slot on the index plate, the outermost bar may be pushed off the carriage so as to simultaneously dis-engage the pin on said bar from the slot on the arm and place such pin in engagement with the slot of the plate, thus fixing said bar with any selected matrix over the casting slot of the mold. During this operation the plunger 40 in the handle 39 may be pressed inwardly into engagement with a suitably disposed notch 41 on the rod 36 and the carriage secured against movement pending the discharge of the bar therefrom. Such discharge is effected by an oscillatory movement of the lever 22, which actuates the pawl and ratchet mechanism, whereby the forward retaining bar 17 is advanced just the proper distance to secure the desired result. The rear, frictionally-held bar 29 in the trough 6 will, of course, be pushed back an equal distance. The teeth of the composer frame, or index plate, are in the present instance not relied on, except initially, to secure the successive bars in their selected positions in the trough; but an arm 46 rigidly secured to the machine bed extends forwardly over the trough just a trifle to one side of the casting slot in the mold, as clearly shown in Fig. 1, and again in Fig. 5. On the under side of such arm and along the edge thereof that is closest to the slot, is formed a spline which, by reason of its location, it will be seen is adapted to engage the transverse grooves in the upper edges of successive bars that lie on the corresponding side of the matrices on their lower edges, which have been brought over said slot. The designating characters (on the upper edges of the bars) lying next to the aforesaid spline-bearing arm will, of course, correspond with the same matrices and present in visible form the line of characters being assembled. Once the bars have been engaged by the spline on this arm, it is immaterial whether the pins thereon remain longer in engagement with slots in the plate 44, or not, and in the constructional form of the latter herein shown, the pins do actually escape from the plate as soon as the bars have been advanced a short distance in the trough. By reason of the visible character of the composition, the operator can observe the successive placing of the matrices in casting position, and as the line is thus composed, the approximate amount of space to be allowed between successive words can be determined, as also the manner in which to split or hyphenate words at the end of the line, without having to try or fit.

To render the location of the successive bars easier, I provide a finder 47 on the slotted arm 35 of the carriage. The inner end of the finder projects rearwardly over the plate 44, so that an opening 48 therein may register with the characters 45 on said plate. The correct location of a bar to bring the desired character thereon over the casting slot may thus be readily determined, although it must be remembered, or otherwise brought to the operator's attention, to which series of characters on said index-plate the particular bar being located belongs. It will be understood, of course, that the one such series corresponds with bars having their larger ends disposed toward one end of the trough, while the other series corresponds with the oppositely disposed bars.

It has been previously indicated that the spaces between words are formed by the overlapping thin ends of paired bars, and that any such space can be made greater or less by varying the relative positions of the bars, as will be apparent. Of course, the intermediate, larger blank spaces which have been described as being formed on the under edges of the bars, may also be used where more extensive spacing, or "quadding", is required. At the conclusion of the composing of a line it will nevertheless frequently happen that a small space will be left over, so that it is necessary to justify such line before casting the slug. This justification, where matrix bars such as those hereinbefore described are employed, is readily and easily accomplished by simply forcing together those pairs of matrix bars which, in the course of distribution of the body of bars have been placed with their thin ends overlapping to form the spaces between successive words; since such inward movement of these paired bars will effect a corresponding spreading of the spaces until the entire line is filled. Such inward movement of the bars in question is obtained in the present improved mechanism by the use of two blocks 49 slidably mounted in each end of the trough. These blocks preferably consist of plates slidably resting on suitable ways or guides and do not contact with the trough bottom but merely depend far enough in the trough to engage with the upper portions of the matrix bars when in said trough, as shown in Fig. 9. In other words, the thin ends of the bars, when the latter are thrown far enough toward the end of the trough to be brought into proximity to either of these blocks, will not be engaged by the latter or disturbed from their position. A corresponding shortening of the length of the trough is thus rendered possible since it is not necessary that the blocks be kept entirely without the range of the distribution. These blocks 49 are operatively connected by a system of levers 50 and connecting rods 51 (Fig. 1), one of such levers bearing a handle 52, so that by manipulation of such handle both blocks are simultaneously forced inwardly. This inward movement of the blocks is continued until the butt-ends of the bars, the thin ends of which thus overlap to form spaces, are engaged with the result previously noted, namely, that the thin edges wedge apart the composed body of bars until the line is completely justified. It is occasionally found desirable to withdraw these justifying bars, as for example in case it is found, upon trying to justify the line, that an additional character may be added or a larger blank space required in order to fill out said line. Means are accordingly provided in connection with the aforesaid blocks 49 for withdrawing the bars that have been selected for justifying. These means conveniently consist of arms or bars 53 disposed transversely of the trough, such arms being supported by slides 54 mounted to the rear of the trough so as to be movable along the latter in the same fashion as the blocks, and such movement is coördinated with that of the latter by means of links 55 connecting each bar with the adjacent block. The distance between each adjacent block and bar is substantially equal to that between the pin 12 on a matrix bar and the larger, or butt, end of such bar, so that when a pair of bars have been thrown out with their butt ends against the blocks 49, in order to have their thin ends overlap across the casting slot, the pins on such matrix bars will respectively lie just beyond the outer edge of these transversely disposed bars, (see Fig. 11). By reason of the connection between the latter and the blocks, any movement of the lever such as will move the blocks outwardly, will serve at the same time to withdraw the matrix bars whose pins are thus engaged.

In order to securely lock down the bars, after they have been thus assembled and justified, locking means are desirably provided. As shown in Fig. 3, such means comprise a vertically movable member 56 carried on the outer end of an arm 57 which extends above the bars into a position substantially directly over the casting slot. Movement of the member 56 downwardly, to clamp the matrix bars, is secured by means of an eccentric 58 connecting said member with the arm and a handle for rotating said eccentric. The arm 57 that carries such locking member is pivotally mounted on the bed of the machine at 59, so as to permit it to be tilted backward when it is desired to obtain free access to the trough and the bars therein. The member 56 and arm 57 are not shown on Fig. 1, as they would obscure the parts lying beneath.

Upon completion of the casting operation, the bars, before being assembled, or brought together in collected form, are of course restored to the carriage, this being accomplished by drawing the rear retaining wall 29 forwardly across the top until stops 60 on the rear ends of the arms 30 engage with the rear edge of the bed of the machine. Said bars are then brought together into a close compact body by means of two plates 61 slidably supported on a rod 62 parallel with rod 36 and supported at its extremities in the same brackets 37 as such last-named rod, said plates being normally disposed out of the way at the respective ends of the carriage. These plates when brought together toward the center of the carriage, are adapted to engage the pins 12 on the upper edges of the several bars as shown in Fig. 8, and the latter may thus be brought into alined position so as to be capable of entering again the slot in the tiltable slotted arm 35. Knobs 63 are provided on the upper faces of these gathering plates, as they may be termed, to facilitate thus sweeping the bars together. It will be understood, of course, that the slotted arm is tilted out of the way during this operation of gathering the bars together.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the class described, the combination of a suitable support; a carrier movable relatively thereto; and a plurality of matrix bars, each formed with a series of matrices, said bars being adapted to rest on said carrier and to be discharged therefrom onto said support in selected position with respect to a fixed transverse line.

2. In mechanism of the class described, the combination of a suitable support; a carrier movable relatively thereto; and a plurality of matrix bars, each formed with a series of matrices, said bars being adapted to rest on said carrier in alinement with the direction of movement of the latter and to be discharged from said carrier onto said support in selected position with respect to a fixed line transverse to such direction.

3. In mechanism of the class described, the combination of a suitable support; a carrier movable relatively thereto; a plurality of matrix bars adapted to rest on said carrier, each of said bars being formed with a series of matrices; and means adapted to discharge successive bars from said carrier onto said support in selected position with respect to a fixed transverse line.

4. In mechanism of the class described, the combination of a suitable support; a carrier movable relatively thereto; a plurality of matrix bars adapted to rest on said carrier in alinement with the direction of movement of the latter; and means adapted to discharge successive bars side-wise from said carrier onto said support in selected position with respect to a fixed line transverse to such direction.

5. In mechanism of the class described, the combination of a suitable support; a carrier movable relatively thereto; a plurality of matrix bars adapted to rest on said carrier and to be discharged therefrom onto said support in selected position with respect to a fixed transverse line; and means adapted to secure said bars in their selected positions.

6. In mechanism of the class described, the combination of a suitable support; a carrier movable relatively thereto; a plurality of matrix bars adapted to rest on said carrier in alinement with the direction of movement of the latter; means adapted to discharge successive bars sidewise from said carrier onto said support in selected position with respect to a fixed line transverse to such direction; and means adapted to secure said bars in their selected positions.

7. In mechanism of the class described, the combination with two laterally adjacent, relatively movable supports; of a plurality of matrix bars, each formed with a series of matrices, said bars being alined with the direction of such relative movement and individually transferable from one support to the other.

8. In mechanism of the class described, the combination with two laterally adjacent, relatively movable supports; of a plurality of matrix bars, each formed with a series of matrices, said bars being alined with the direction of such relative movement and transferable from one support to the other; and means adapted to transfer successive bars from one support to the other in selected position with respect to a fixed transverse line thereon.

9. In mechanism of the class described, the combination with two laterally adjacent, relatively movable supports; of a plurality of matrix bars, each formed with a series of matrices, said bars being alined with the direction of such relative movement and individually transferable from one support to the other; and means adapted to secure said bars against longitudinal movement on one of said supports.

10. In mechanism of the class described, the combination with two laterally adjacent, relatively movable supports; of a plurality of matrix bars alined with the direction of such relative movement and transferable from one support to the other; means adapted to transfer successive bars from one support to the other in selected position with respect to a fixed transverse line thereon; and means adapted to secure said bars in their selected positions on such last-named support.

11. In mechanism of the class described, the combination with two laterally adjacent supports, one movable relatively to the other; of a plurality of matrix bars, each formed with a series of matrices, said bars being alined with the direction of such relative movement and transferable from one support to the other; and means adapted to transfer successive bars from the movable support to the other in selected position with respect to a fixed transverse line thereon.

12. In mechanism of the class described, the combination with two laterally adjacent supports, one movable relatively to the other; of a plurality of matrix bars alined with the direction of such relative movement and transferable from one support to the other; means adapted to transfer successive bars from the movable support to the other in selected position with respect to a fixed transverse line thereon; and means adapted to secure said bars against longitudinal movement in their selected positions.

13. In mechanism of the class described, the combination with two laterally adjacent, relatively movable supports; of a plurality of matrix bars, each formed with a series of matrices, said bars being alined with the direction of such relative movement and individually transferable from one support to the other; and means on each of said supports adapted to hold the bars thereon against longitudinal movement.

14. In mechanism of the class described, the combination of a suitable support; a carrier movable relatively thereto; a plurality of matrix bars adapted to rest on said carrier in alinement with the direction of movement of the latter; means adapted to secure said carrier, with the bars thereon, in various selected positions relatively to a fixed transverse line; and means adapted to discharge successive bars from said carrier onto said support.

15. In mechanism of the class described, the combination of a suitable support; a carrier movable relatively thereto; a plurality of matrix bars adapted to rest on said carrier in alinement with the direction of movement of the latter; means adapted to secure said carrier, with the bars thereon, in various selected positions relatively to a fixed transverse line; means adapted to discharge successive bars from said carrier onto said support; and means adapted to secure said bars in their positions as discharged onto said support.

16. In mechanism of the class described, the combination of a suitable support; a carrier movable relatively thereto; a plurality of matrix bars adapted to rest on said carrier in alinement with the direction of movement of the latter; means adapted to hold said bars against longitudinal movement on said carrier; means adapted to secure said carrier, with the bars thus held thereon, in various selected positions relatively to a fixed transverse line; and means adapted to discharge successive bars from said carrier onto said support.

17. In mechanism of the class described, the combination of a suitable support; a carrier movable relatively thereto; a plurality of matrix bars adapted to rest on said carrier in alinement with the direction of movement of the latter; means adapted to hold said bars against longitudinal movement on said carrier; means adapted to secure said carrier, with the bars thus held thereon, in various selected positions relatively to a fixed transverse line; means adapted to discharge successive bars from said carrier onto said support; and means adapted to secure said bars in their positions as discharged onto said support.

18. In mechanism of the class described, the combination of a suitable support; a carrier movable relatively thereto; a plurality of matrix bars adapted to rest on said carrier in alinement with the direction of movement of the latter; and means adapted to collect the bars on said carrier into a compact body; means adapted to hold said bars, when in such collected condition, against longitudinal movement on said carrier; and means adapted to discharge successive bars from said carrier onto said support.

19. In mechanism of the class described, the combination of a suitable support; a carrier movable relatively thereto; a plurality of matrix bars adapted to rest on said carrier in alinement with the direction of movement of the latter; means adapted to collect the bars on said carrier into a compact body; means adapted to hold said bars, when in such collected condition, against longitudinal movement on said carrier; means adapted to secure said carrier, with the bars thereon, in various selected positions relatively to a fixed transverse line; and means adapted to discharge successive bars from said carrier onto said support.

20. In mechanism of the class described, the combination of a suitable support; a carrier movable relatively thereto; a plurality of matrix bars adapted to rest on said carrier in alinement with the direction of movement of the latter; means adapted to collect the bars on said carrier into a compact body; means adapted to hold said bars, when in such collected condition, against longitudinal movement on said carrier; means adapted to secure said carrier, with the bars thereon, in various selected positions relatively to a fixed transverse line; and means adapted to discharge successive bars from said carrier onto said support.

21. In mechanism of the class described, the combination of a suitable support; a plurality of tapered matrix bars movably resting thereon; upwardly extending projections on said bars; means adapted to engage the ends of said bars to force the same together; and other means adapted to engage with the projections on said bars to draw the latter apart.

Signed by me this 25th day of October, 1912.

WILLIAM A. READE.

Attested by—
D. S. DAVIES,
JNO. F. OBERLIN.